US008666664B2

(12) United States Patent
Chiu et al.

(10) Patent No.: US 8,666,664 B2
(45) Date of Patent: Mar. 4, 2014

(54) ELECTRONIC SEAL

(75) Inventors: Chien-Sheng Chiu, Taichung (TW); Chin-Cheng Chen, Taichung (TW); Kuo-Liang Liao, Taichung (TW)

(73) Assignee: Syris Technology Corp., Taichung (TW)

( * ) Notice: Subject to any disclaimer, the term of this patent is extended or adjusted under 35 U.S.C. 154(b) by 1132 days.

(21) Appl. No.: 12/626,838

(22) Filed: Nov. 27, 2009

(65) Prior Publication Data

US 2011/0130987 A1 Jun. 2, 2011

(51) Int. Cl.

*B65D 55/02* (2006.01)
*E05B 17/22* (2006.01)
*G06F 19/00* (2011.01)

(52) U.S. Cl.

USPC .................... 702/1; 70/57.1; 70/432; 70/440; 340/426.24; 340/541; 702/57; 702/65; 702/127

(58) Field of Classification Search

USPC ............ 53/52, 507, 508; 70/1, 14, 20, 50, 51, 70/57, 57.1, 431, 432, 439, 440, 441; 73/432.1, 865.8, 866.3; 292/307 R, 292/327; 324/72, 500, 537, 539, 542, 543, 324/549, 600, 629, 691, 713; 327/1, 50, 74, 327/77; 340/384.1, 425.5, 426.1, 426.24, 340/426.28, 426.29, 431, 500, 540, 541, 340/542, 545.1, 545.2, 545.4, 545.6, 568.1, 340/571, 635, 652, 653, 654, 693.5, 815.4, 340/870.01, 870.07, 870.16; 702/1, 57, 64, 702/65, 127, 182, 187, 188, 189; 708/100, 708/105, 200

IPC ............... B60J 9/00,10/00, 10/10; B65D 50/00, B65D 51/00, 51/24, 51/248, 55/00, 55/02, B65D 55/028, 2251/00, 2255/00, 2255/06, B65D 2555/00, 2555/06; E05B 17/00, 17/0079, E05B 17/20, 17/22, 17/226, 39/00; G01D 7/00, G01D 21/00; G01R 27/00, 27/02, 27/14, G01R 31/00, 31/02, 31/021, 31/024; G06F 11/00, 11/30, 11/32, 17/00, 17/40, 19/00; G08B 13/00, 13/02, 13/06

See application file for complete search history.

(56) References Cited

U.S. PATENT DOCUMENTS

| | | | | |
|---|---|---|---|---|
| 2,623,959 | A * | 12/1952 | Jarrett | 200/43.04 |
| 3,134,254 | A * | 5/1964 | Richard | 70/277 |
| 3,147,468 | A * | 9/1964 | Daniels | 340/542 |
| 3,408,642 | A * | 10/1968 | Palladino | 340/510 |
| 3,588,865 | A * | 6/1971 | Hansen | 340/501 |
| 3,608,342 | A * | 9/1971 | Katz | 70/271 |
| 5,191,314 | A * | 3/1993 | Ackerman et al. | 340/542 |
| 6,243,005 | B1 * | 6/2001 | Haimovich et al. | 340/427 |
| 6,747,558 | B1 * | 6/2004 | Thorne et al. | 340/551 |
| 7,044,512 | B1 * | 5/2006 | Moreno | 292/259 R |
| 7,579,949 | B2 * | 8/2009 | Chiu | 340/552 |
| 7,597,253 | B2 * | 10/2009 | Lin et al. | 235/382 |
| 2005/0263602 | A1 * | 12/2005 | Lin et al. | 235/492 |
| 2007/0279223 | A1 * | 12/2007 | Chiu | 340/545.3 |

* cited by examiner

*Primary Examiner* — Edward Cosimano

(74) *Attorney, Agent, or Firm* — Muncy, Geissler, Olds & Lowe, P.C.

(57) ABSTRACT

An electronic seal of the present invention includes a bolt. The bolt is used to mount on a door latch of a cargo and inserts into a shell. The shell is provided with a control circuit to actively send a warning signal as the bolt is moved. As such, the user of the electronic seal can be properly informed to prevent theft.

8 Claims, 8 Drawing Sheets

ELECTRONIC SEAL

BACKGROUND OF THE INVENTION

1. Field of the Invention

The present invention relates to an electronic seal.

2. Description of the Prior Art

A conventional electronic seal, such as disclosed in U.S. Pat. No. 7,597,253, U.S. Pat. No. 6,747,558 or U.S. Pat. No. 7,044,512, is mainly used to seal a cargo or the like. They mainly include a circuit to determine whether a seal is severed or not.

SUMMARY OF THE INVENTION

The main object of the present invention is to provide an electronic seal that can sensitively monitor the integrity thereof.

To achieve the above and other objects, an electronic seal of the present invention includes a shell and a bolt. The sell has a circuit board and a power supply disposed therein. The circuit board includes at least one control circuit and at least three terminals. Each of the terminals extends into the passage. The bolt includes a rod portion having at least one conducting surface disposed around its outer surface. The rod portion is inserted into the passage so that the conducting surface is in contact with the terminals to define a conducting state.

As such, the conducting state varies as the rod portion sliding with respect to the passage, and the control circuit will thereafter send a warning signal corresponding to a variation of the conduction state.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
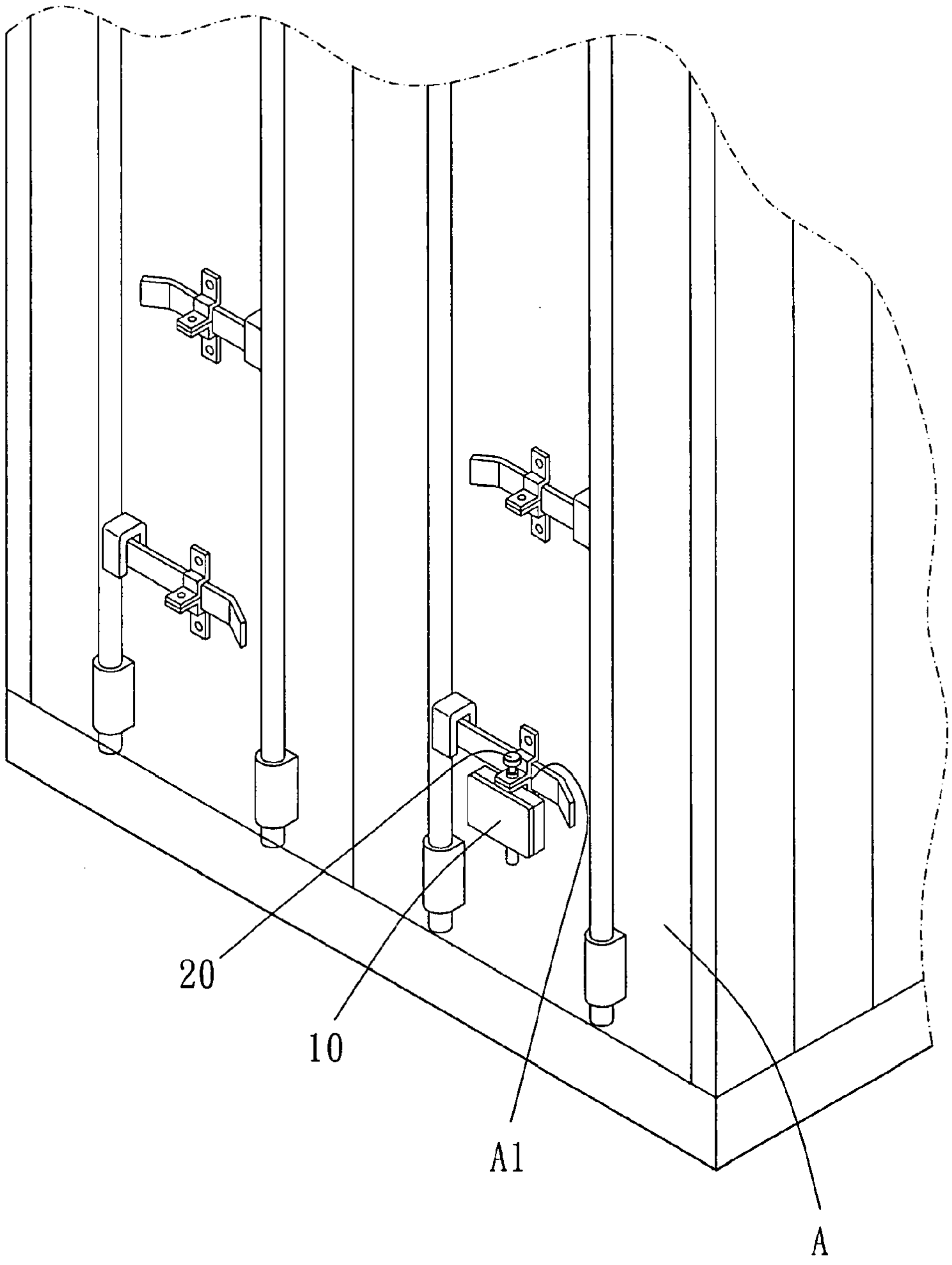
FIG. 1 is a drawing showing an electronic seal mounting on a door latch of a cargo.

Please refer to FIG. 1. An electronic seal of the present invention includes a shell 10 and a bolt 20. The electronic seal is adapted to mount on a door latch A1 of a cargo door A. To open the cargo door A, one must dismount the electronic seal. Thus the electronic seal will send a warning signal to properly inform the cargo keeper of the severance thereof.

Figure 2:
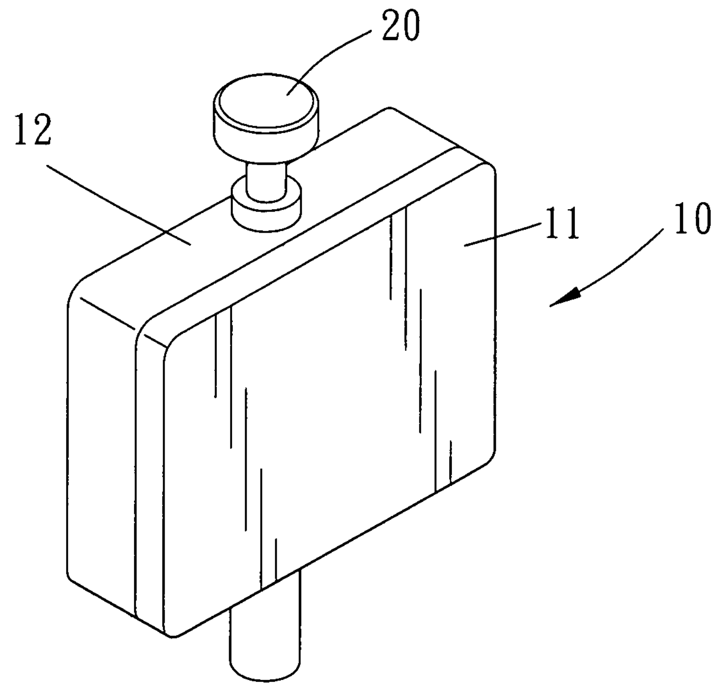
FIG. 2 is a perspective drawing showing an electronic seal of the present invention.
Figures 3, 3A:
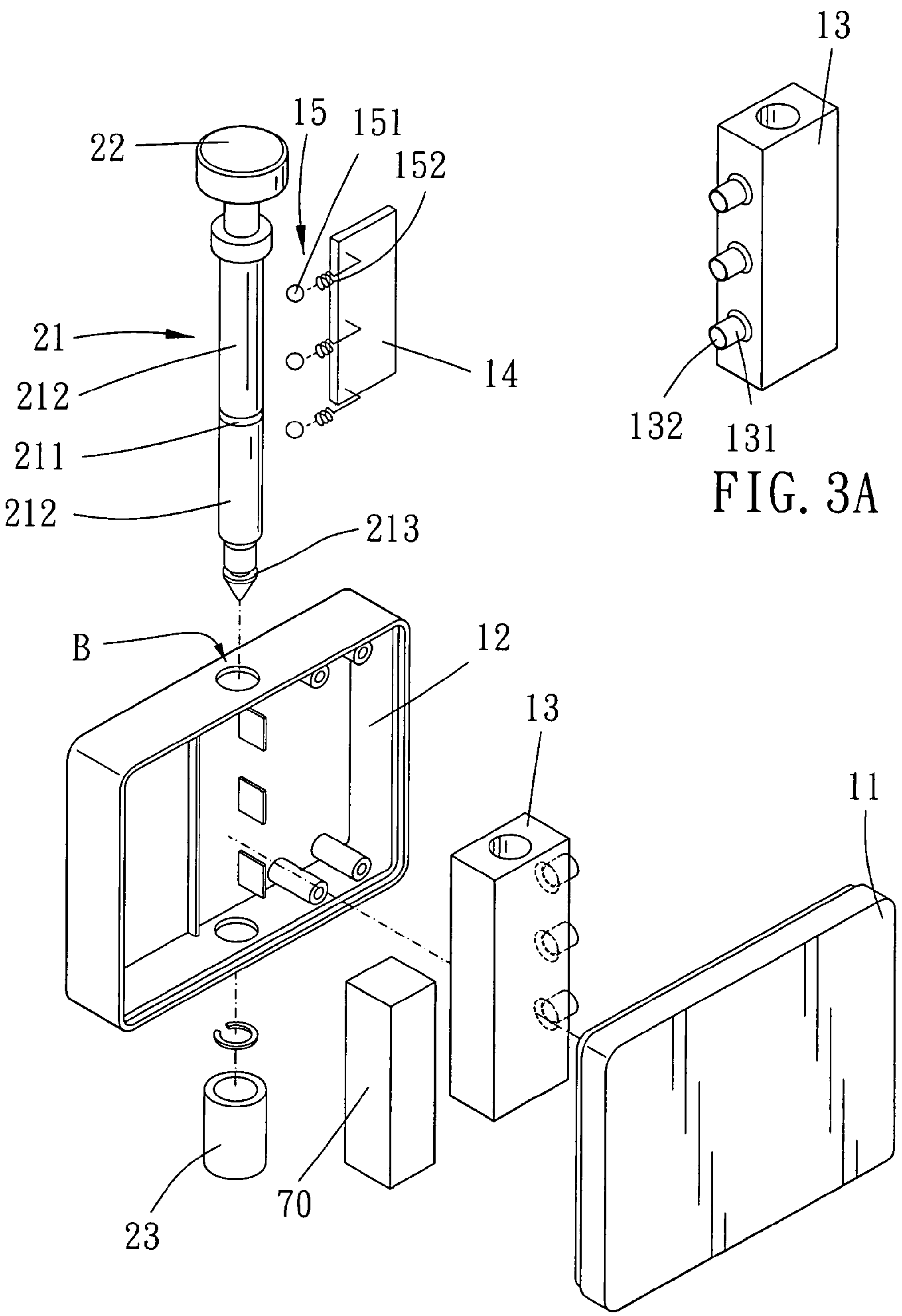
FIG. 3 is a breakdown drawing showing an electronic seal of the present invention.
FIG. 3A is a perspective drawing showing a shank of the present invention at another angle of view.

Please refer to FIG. 2 and FIG. 3. The shell 10 may consist of an upper shell 11 and a lower shell 12 combined with each other. The shell 10 includes a shank 13 disposed between the upper and lower shells 11 and 12. The shell 10 and the shank 13 define a passage B therethrough. As shown in FIG. 3 and FIG. 3A, another side of the shank 13 is formed with three protrusions 131 vertically arranged in a row. Each protrusion 131 is formed with a through hole 132 communicating with the passage B. The shell 10 has a circuit board and a power supply 70 disposed therein, and the circuit board includes a control circuit 14 and three terminals 15, each of which is electrically connected to the control circuit 14 and extends into the passage B. Specifically, each terminal 15 includes a metal ball 151 and a conducting resilient member 152. Please refer to FIG. 4. Each terminal 15 is disposed in the protrusion 131, and the metal ball 151 is protrusive from the through hole 132 and extends into the passage B. The power supply 70 provides electricity to the control circuit 14 and other parts in the electronic seal.

The bolt 20 includes a rod portion 21 consisting of an upper tube and a lower tube inserted into the upper tube. The rod portion 21 is adapted to insert through the door latch A1 of the cargo door A to seal the cargo. The rod portion 21 has at least one conducting surface disposed around its outer surface and has at least one insulation unit 211. The insulation unit 211 divides the conducting surface into two (or more) conducting zones 212 isolated from each other and arranged along a lengthy direction of the rod portion 21. The bolt 20 further includes an enlarged head portion 22. A lower end of the rod portion 21 is formed with a concaved engaging groove 213 for an engaging sleeve 23 to mount therewith. As such, the rod portion 21 engages with the shell 10.

Figure 4:
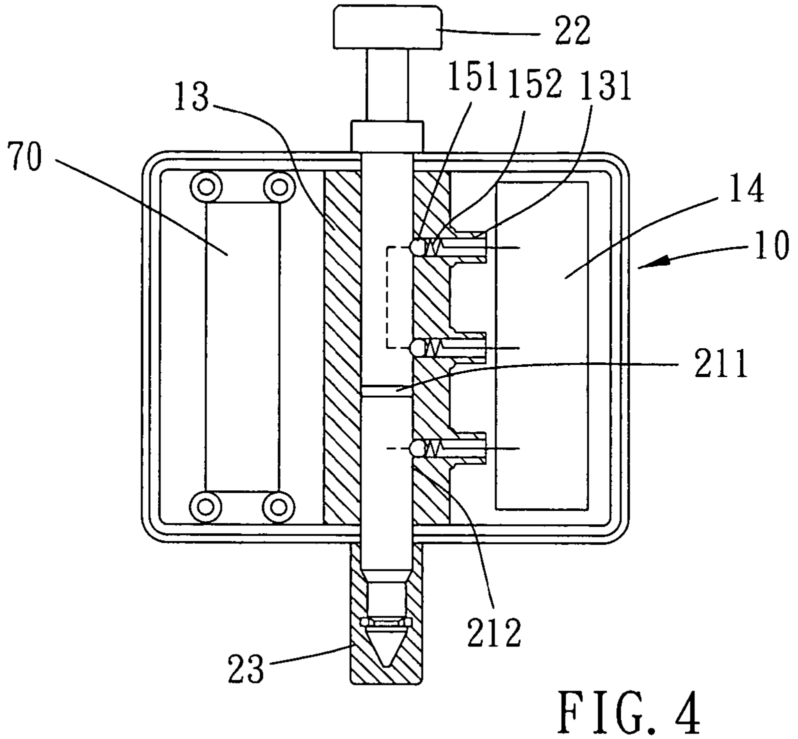
FIG. 4 is a profile showing an electronic seal of the present invention.

Please refer to FIG. 4. The bolt 20 inserts in the passage and the conducting surface is in contact with the terminals 15, i.e. the metal balls 151 to define a conducting state. Specifically, the insulation unit 211 locates between the lower two terminals 15 as the rod portion 21 engages with the shell 10. Due to the division of the insulation unit 211, the upper conducting zone 212 conducts the upper two terminals 15 to form a first closed circuit. On the other hand, the lower terminal 15 is isolated from the other two and forms a first open circuit. The conducting state includes the first closed circuit and the first open circuit.

Figure 5:
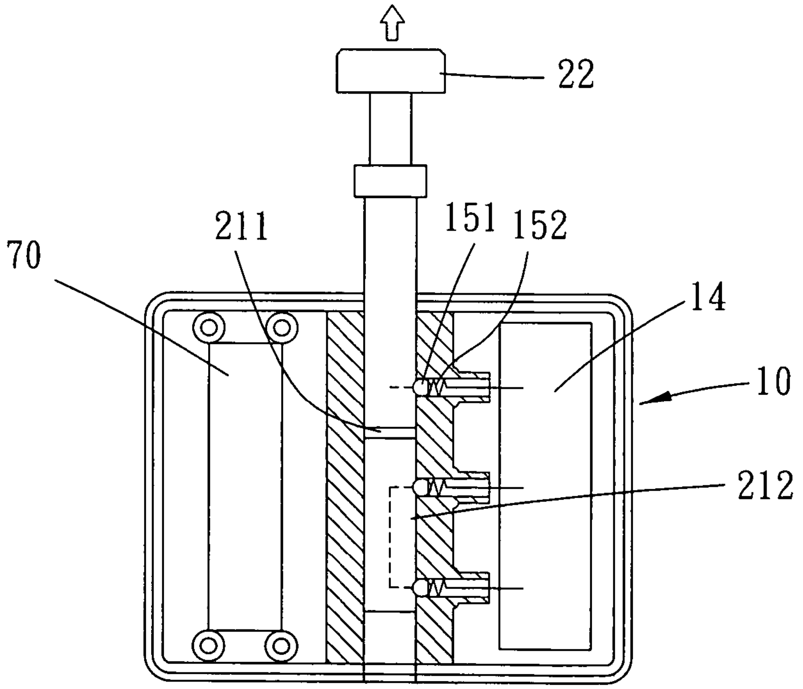
FIG. 5 is a profile showing an electronic seal, whose bolt is drawing out of a passage, of the present invention.
Figure 9:
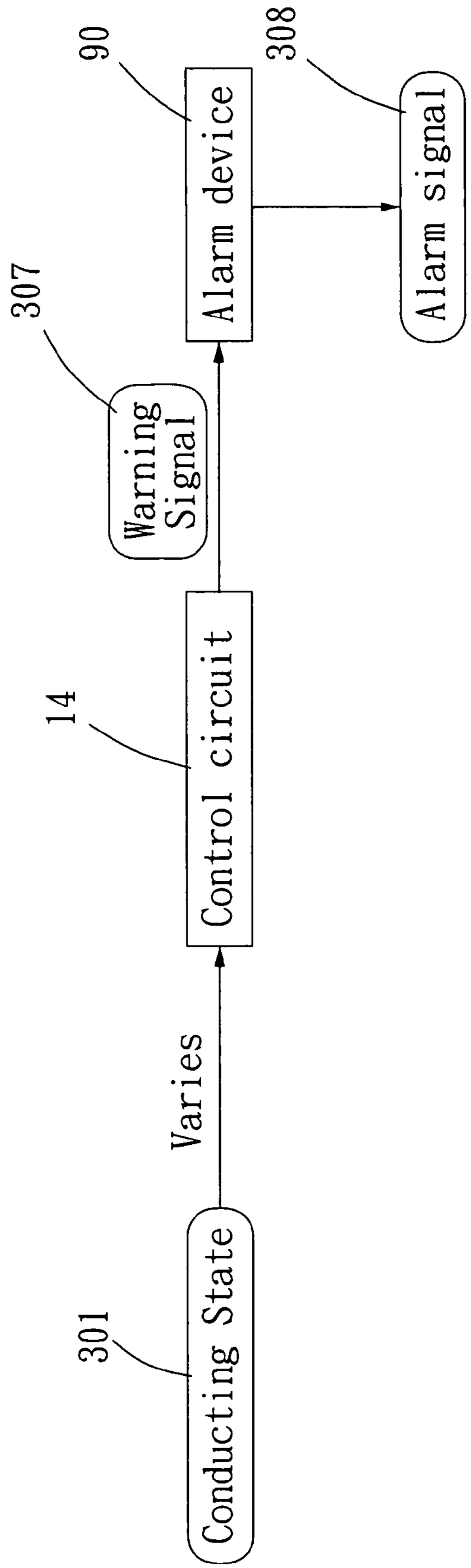
FIG. 9 is a detailed block diagram of the present invention.

Please refer to FIG. 5. As the bolt 20 is being withdrawn, the location of the insulation unit 211 changes and locates between the upper two terminals 15. As such, the lower two terminals 15 is conducted to form a second closed circuit, and the upper terminal 15 is isolated to form a second open circuit. Accordingly, the conducting state varies and includes the second open circuit and the second closed circuit. Thus the control circuit 14 sends a warning signal 307 corresponding to the variation of the conducting state 301, as shown in FIG. 9.

Figure 6:
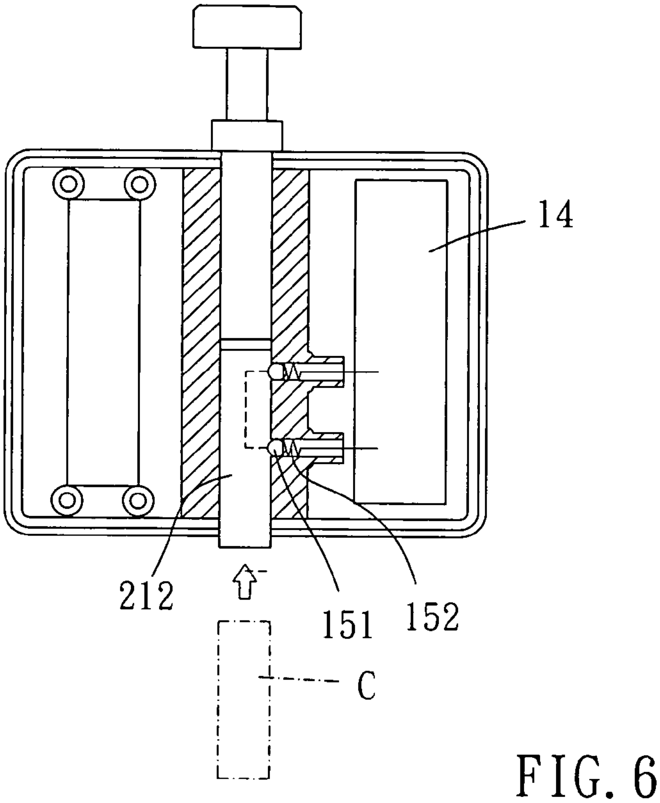
FIG. 6 is a profile showing an electronic seal with only two terminals.

As shown in FIG. 6, it is noted that there are only two terminals included in such electronic seal. The conducting zone 212 conducts the two terminals to form a closed circuit and has an active detecting ability. However, such design may be easily cracked by inserting another conducting pole C to push the bolt upward. As such, no variation of the conducting state will be achieved, and no warning signal will be sent. That is, an electronic seal with merely two terminals is not secure enough to monitor the integrity of the cargo.

Figure 7:
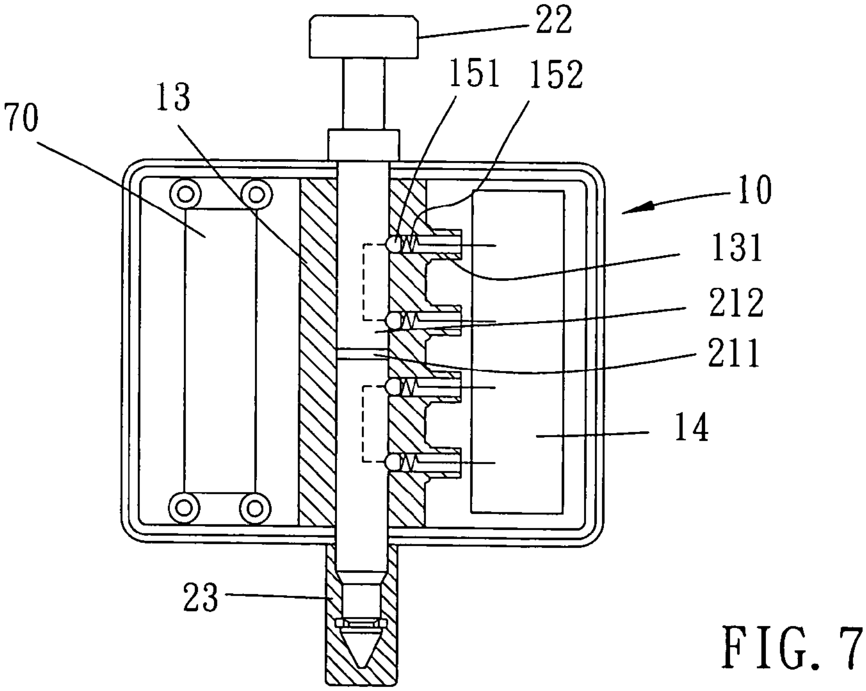
FIG. 7 is a profile showing an electronic seal with four terminals.

As shown in FIG. 7, there are more than three terminals present in one electronic seal. Such electronic seal has an insulation unit 211 locating between two of the terminals and has at least one conducting zone conducting two of the terminals to form at least one closed circuit. As such, the conducting state will vary once the bolt is withdrawn from the passage.

Figure 8:
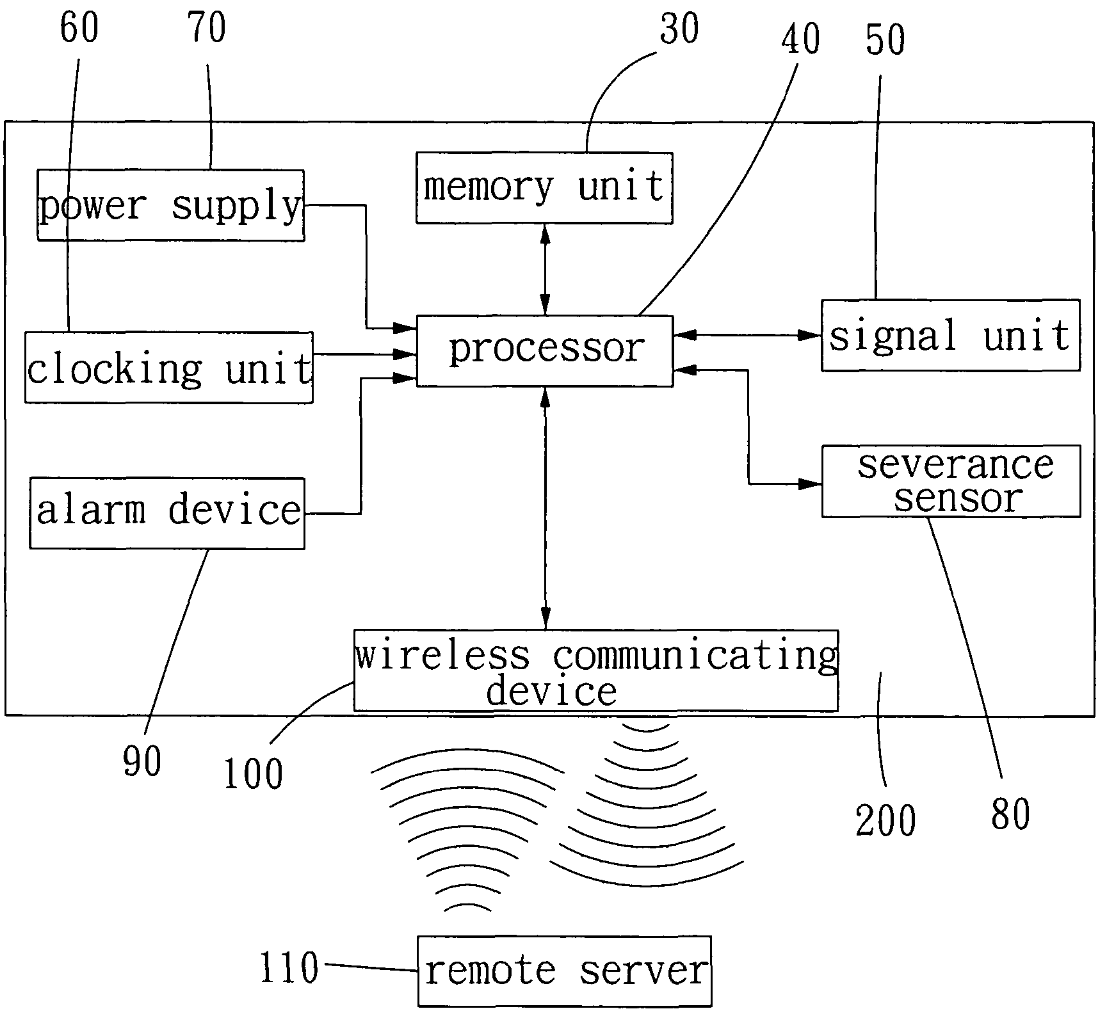
FIG. 8 is a block diagram of an electronic seal of the present invention.
Figure 8A:
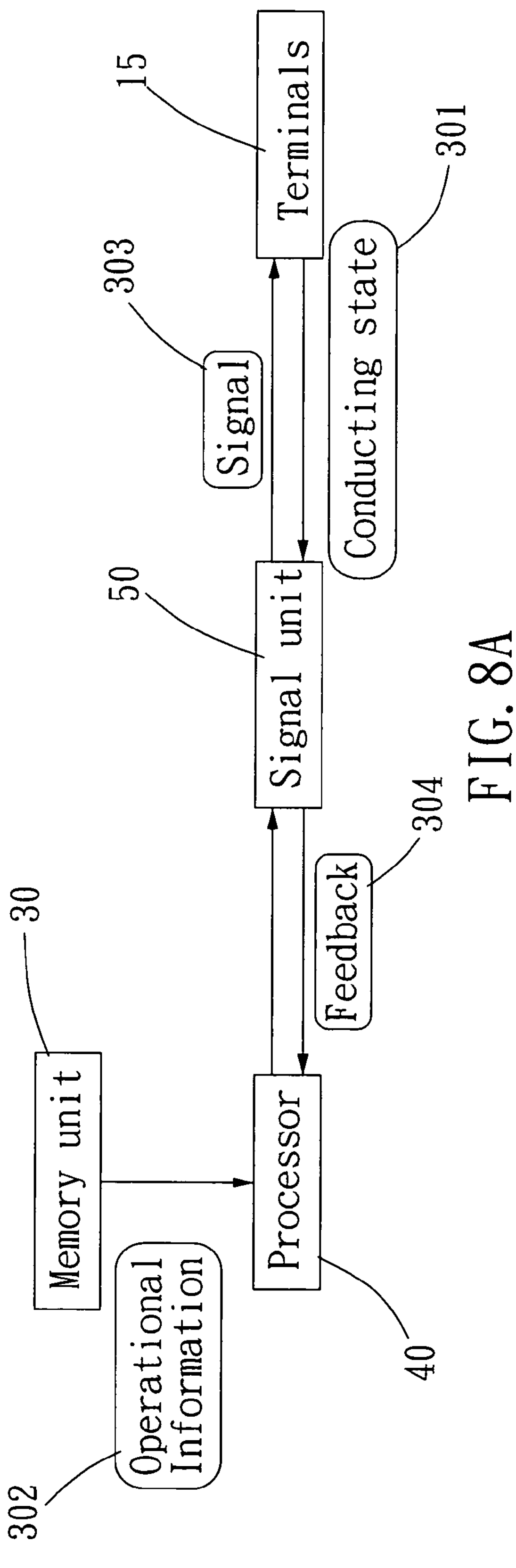
FIG. 8A is a detailed block diagram of the present invention.
Figure 8B:
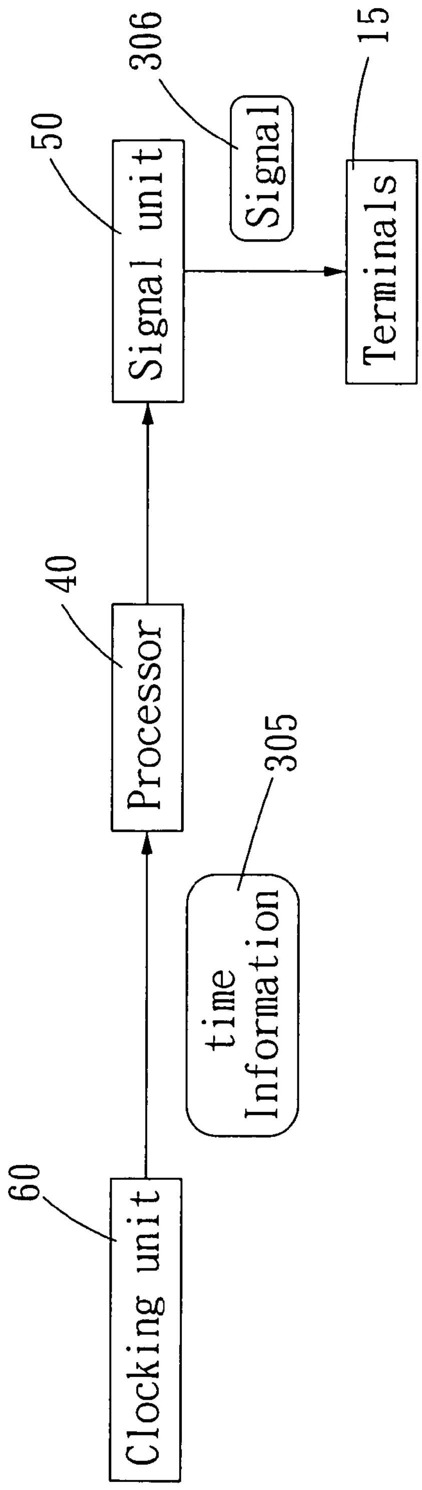
FIG. 8B is a detailed block diagram of the present invention.

Please refer to FIG. 8. The circuit board 200 may further provided with a memory unit 30, a processor 40, a signal unit 50 and a clocking unit 60, which are all electrically connected to the control circuit. As shown in FIG. 8A, the memory unit 30 is stored with at least one operational information 302. The processor 40 is adapted to read the operational information 302 to make the signal unit 50 send signals 303 to the terminals 15. Specifically, the signal unit 50 determines how much electric potential one terminal should have. The signal unit 50 then monitors whether there is a current flowing between the terminals, i.e. the signal unit 50 monitors the conducting state 301 and send a feedback 304 to the control circuit. As shown in FIG. 8B, the clocking unit 60 provides the processor 40 with a time information 305, and the processor 40 makes the signal unit 50 send different signals 306 to the terminals 15 corresponding to the time information 305. That is, the electric potential of each terminal will be varied, providing different conducting state. Due to the time depending conducting state design, the electronic seal of the present invention achieves better protection and cannot be easily cracked.

The control circuit may be further provided with a severance sensor 80 to monitor the integrity of the shell. Also, the circuit board 200 may be further installed with a radio frequency chip powered by the power supply 70. The radio frequency chip can be stored with goods information of the cargo.

As shown in FIG. 9, the warning signal 307 will be sent to an alarm device 90 selected from a group consisting of a lighting device such as a bulb, an LED or the like, an audio device such as a speaker, a buzzer or the like, and a combination thereof. That is, the alarm device 90 will shine or make sounds once it receives the warning signal, so as to send an alarm signal 308 to inform the cargo keeper.

Furthermore, the warning signal may further transferred to a remote server 110, such as a PC, an NB or a PDA, by wireless transference means. That is, the remote server 110 and the control circuit are in a signal communicable relationship. The wireless transference means includes two bidirectional wireless communicating devices 100 disposed on both the remote server 110 and the circuit board 200, in which the communicating device 100 of the circuit board 200 is electrically connected to the control circuit. As such, a user of the electronic seal can simply monitor the remote server to manage a plurality of cargos. Also, the user may change the conducting state of the electronic seal by operating the remote server.

What is claimed is:

1. An electronic seal, comprising:

a shell, defining a passage, the shell having a circuit board and a power supply disposed therein, the circuit board comprising at least one control circuit and at least three terminals, each of the terminals being electrically connected to the control circuit and extending into the passage;

a bolt, comprising a rod portion, the rod portion having at least one conducting surface disposed around its outer surface, the rod portion being inserted into the passage and selectively engaged with the shell, the conducting surface being in contact with the terminals to define a conducting state, the conducting state varies as the rod portion sliding with respect to the passage, the control circuit sending a warning signal corresponding to a variation of the conducting state.

2. The electronic seal of claim 1, further comprising a remote server, both the remote server and the control circuit electrically connecting to a bidirectional wireless communicating device, whereby the remote server and the control circuit are in a signal communicable relationship.

3. The electronic seal of claim 1, wherein the bolt further comprises at least one insulation unit, the insulation unit divides the conducting surface into at least two conducting zones isolated from each other.

4. The electronic seal of claim 3, wherein the insulation unit locates between two of the terminals as the rod portion engages with the shell.

5. The electronic seal of claim 1, wherein the control circuit further electrically connects to a memory unit, a processor, a signal unit and a radio frequency chip, the memory unit is stored with at least one operational information, the processor is adapted to read the operational information to make the signal unit send signals to the terminals, then the signal unit receives the conducting state and sends a feedback to the processor.

6. The electronic seal of claim 5, wherein the control circuit further electrically connects to a clocking unit, the clocking unit provides the processor with a time information, the processor makes the signal unit send different signals to the terminals corresponding to the time information.

7. The electronic seal of claim 1, wherein the control circuit further electrically connects to an alarm device, the alarm device sends an alarm signal corresponding to the warning signal.

8. The electronic seal of claim 7, wherein the alarm device is selected from a group consisting of a lighting device, an audio device and a combination thereof.

* * * * *